United States Patent [19]

Böger et al.

[11] 4,040,811
[45] Aug. 9, 1977

[54] METHOD FOR THE CULTIVATION OF PLANTS EMPLOYING N-ALKYL-N-PHENYLSULFENYL-N'-PHENYL-FORMAMIDINE DERIVATIVES

[75] Inventors: Manfred Böger, Haltingen, Germany; Joseph Drabek, Allschwil, Switzerland; Georg Pissiotas, Lorrach, Germany

[73] Assignee: Ciba-Geigy Corporation, Ardsley, N.Y.

[21] Appl. No.: 647,840

[22] Filed: Jan. 9, 1976

Related U.S. Application Data

[63] Continuation-in-part of Ser. No. 551,464, Feb. 20, 1975, abandoned.

[30] Foreign Application Priority Data

Feb. 25, 1974 Switzerland ............................ 2630/74
July 30, 1974 Switzerland ............................ 10472/74
Sept. 10, 1974 Switzerland ............................ 12300/74
Feb. 7, 1975 Switzerland ............................ 1549/75

[51] Int. Cl.² .................................................. A01N 5/00
[52] U.S. Cl. ................................................... 71/78; 71/76; 71/98; 260/465 E; 260/564 RF
[58] Field of Search .................... 71/98, 76, 78, 121; 260/564 RF

[56] References Cited

U.S. PATENT DOCUMENTS

| 3,781,356 | 12/1973 | Duerr et al. | 71/121 |
| 3,781,357 | 12/1973 | Duerr et al. | 71/121 |
| 3,803,134 | 4/1974 | Duerr et al. | 260/564 RF |
| 3,887,619 | 6/1975 | Rizzo | 260/564 RF |
| 3,971,647 | 7/1976 | Gaetzi et al. | 71/76 |

Primary Examiner—Glennon H. Hollrah
Attorney, Agent, or Firm—Harry Falber

[57] ABSTRACT

The invention relates to a method for the cultivation of plants involving the regulation of plant growth which comprises applying an effective amount of a compound of the formula I

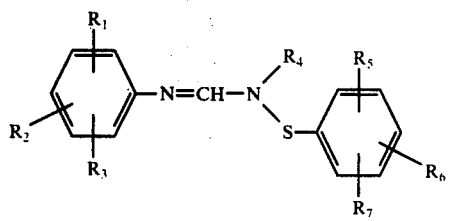

(I)

wherein
$R_1$, $R_2$ and $R_3$, independently of one another, represent hydrogen, chlorine, bromine, methyl, ethyl, trifluoromethyl or cyano,
$R_4$ represents methyl or ethyl and
$R_5$, $R_6$ and $R_7$, independently of one another, represent hydrogen, chlorine, bromine or $C_1$–$C_4$-alkyl.

5 Claims, No Drawings

METHOD FOR THE CULTIVATION OF PLANTS EMPLOYING N-ALKYL-N-PHENYLSULFENYL-N'-PHENYL-FORMAMIDINE DERIVATIVES

CROSS REFERENCE

This application is a continuation-in-part of our application Ser. No. 551,464 filed Feb. 20, 1975, now abandoned.

DETAILED DISCLOSURE

The present invention relates to a method for the regulation of plant growth employing N-alkyl-N-phenylsulfenyl-N'-phenyl-formamidine derivatives.

More particularly the present invention relates to a method for the regulation of plant growth, which method comprises applying to plants under cultivation an effective amount of a compound of the formula I

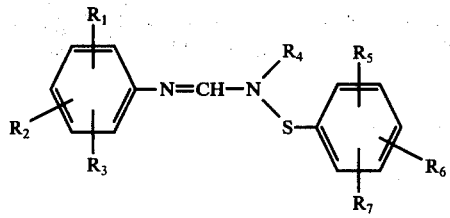

(I)

wherein
$R_1$, $R_2$ and $R_3$, independently of one another, represent hydrogen, chlorine, bromine, methyl, ethyl, trifluoromethyl or cyano,
$R_4$ represents methyl or ethyl and
$R_5$, $R_6$ and $R_7$, independently of one another, represent hydrogen, chlorine, bromine or $C_1$–$C_4$–alkyl.

Especially preferred for use in the method according to the present invention are compounds of the above formula I wherein
$R_1$ and $R_2$, independently of one another, represent chlorine, methyl or trifluoromethyl,
$R_3$ represents hydrogen,
$R_4$ represents methyl,
$R_5$ and $R_6$, independently of one another, represent hydrogen, chlorine, methyl or tert.-butyl and
$R_7$ represents hydrogen,
and in particular compounds of the above formula I wherein
$R_1$ represents chlorine or methyl in the 2- or 3-position,
$R_2$ represents chlorine or methyl in the 4- or 6-position,
$R_3$ represents hydrogen,
$R_4$ represents methyl,
$R_5$ represents hydrogen, chlorine or methyl and
$R_6$ and $R_7$ both represent hydrogen.

By the term "$C_1$–$C_4$–alkyl" as used above is meant straight- and branched-chain alkyl groups having at most 4 carbon atoms i.e. methyl, ethyl, n-propyl, i-propyl, n-butyl, i-butyl, t-butyl and sec-butyl.

The compounds of the formula I may be prepared in a manner analogous to known method, for example by reacting a compound of the formula II (II)

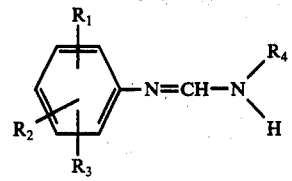

-continued with a compound of the formula III (III)

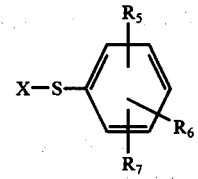

in the presence of an acid binding agent, whereby in the formulae II and III $R_1$ through $R_7$ have the meanings given above and X represents a halogen, especially a chlorine, atom.

Suitable acid-binding agents for use in the above process include for example: formamidines of formula II; tertiary amines such as triethylamine, dimethylaniline or pyridine, as well as inorganic bases such as the hydroxides and carbonates of the alkali metals and alkaline-earth metals, especially sodium or potassium carbonate. The reaction may suitably be performed at normal pressure and at a temperature of between $-20°$ and $+30°$ C, in solvents and diluents which are inert to the reactants. Suitable solvents and diluents are, e.g.: aromatic hydrocarbons, chlorobenzene, polychlorobenzenes, bromobenzene, chlorinated alkanes having 1 to 3 carbon atoms, ethers such as dioxane or tetrahydrofuran; esters such as ethyl acetate; ketones such as methyl ethyl ketone or diethyl ketone; and nitriles.

The starting materials of formulae II and III are known or may be produced by methods known per se.

The following examples is illustrative of the above process:

EXAMPLE 1

Production of N-methyl-N-(2,5-dichlorophenylsulfenyl)-N'-(2'-chloro-6'-methylphenyl)-formamidine 32.1 g of 2,5-dichlorophenylsulfenyl chloride is added dropwise at 5°–10° C, with continuous stirring, to a solution of 27.4 g of N-methyl-N'-(2'-chloro-6'-methylphenyl)-formamidine in 70 ml of pyridine. The mixture is stirred for 20 minutes at room temperature; the excess pyridine is then removed at 1 mm Hg pressure and 50° C.

200 ml of ice water is added to the semicrystalline residue; the crystalline product is filtered off under suction, washed with water and rigorously pressed out. It is subsequently mixed to a paste with cold hexane and again rigorously pressed out.

After drying at 40° C, there is obtained the compound of the formula (Compound No. 1)

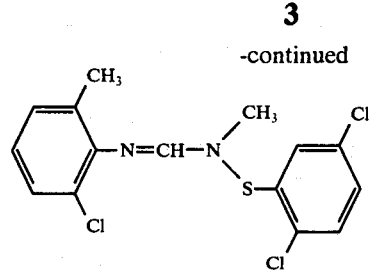

as a light-beige powder having a melting point of 73°–74° C.

The following compounds are produced analogously:

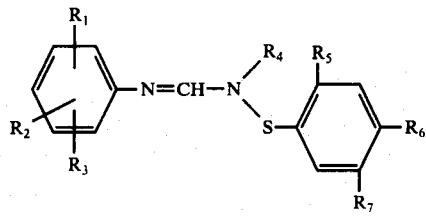

In accordance with the present invention it has now surprisingly been found that the growth of plants may be advantageously controlled or modified by the application of the above described compounds of the formula I.

In particular the compounds of the formula I have been found to restrict vegetative growth and/or growth in height in a variety of plant species, both mono- and di-cotyledenous, and can accordingly be usefully employed for inhibiting and/or regulating the growth of, for example, grasses, shrubs, trees, cereal crops, leguminosae, sugar cane, onion, potato tubers, fruit trees and, in particular, tobacco, soya and ornamental plants, where especially a checking of the growth of undesirable side shoots is achieved.

In the case of grasses, the application of the compounds of the formula I results in a slower rate of growth, so that, e.g. lawns, golf-courses and green shoulders along motor-ways and turnpikes will require less frequent cutting. The economic advantages accruing are self-evident.

With cereal crops application of the active substances results in the development of shorter sturdier stems and a concommitant improvement in fruit development.

| Compound No. | $R_1$ | $R_2$ | $R_3$ | $R_4$ | $R_5$ | $R_6$ | $R_7$ | Physical Data |
|---|---|---|---|---|---|---|---|---|
| 2 | 2-$CH_3$ | 4-Cl | H | $CH_3$ | H | H | H | $n_D^{20}$: 1,6321 |
| 3 | 2-$CH_3$ | 4-Cl | H | $CH_3$ | H | $CH_3$ | H | M.P.: 48–49° C |
| 4 | 2-$CH_3$ | 4-Cl | H | $CH_3$ | H | H | $CH_3$ | $n_D^{20}$: 1,6231 |
| 5 | 2-$CH_3$ | 4-Cl | H | $CH_3$ | $CH_3$ | H | H | $n_D^{20}$: 1,6330 |
| 6 | 2-$CH_3$ | 4-Cl | H | $CH_3$ | H | t-$C_4H_9$ | H | $n_D^{20}$: 1,6010 |
| 7 | 2-$CH_3$ | 4-Cl | H | $CH_3$ | H | Cl | H | M.P.: 56–58° C |
| 8 | 2-$CH_3$ | 4-Cl | H | $CH_3$ | H | Br | H | $n_D^{20}$: 1,6510 |
| 9 | 2-$CH_3$ | 4-Cl | H | $CH_3$ | Cl | H | Cl | M.P.: 68–70° C |
| 10 | 2-$CH_3$ | 4-Cl | H | $CH_3$ | Cl | Cl | Cl | M.P.: 68–70° C |
| 11 | 2-$CH_3$ | H | 6-Cl | $CH_3$ | H | H | H | $n_D^{20}$: 1,6199 |
| 12 | 2-$CH_3$ | H | 6-Cl | $CH_3$ | H | $CH_3$ | H | M.P.: 50–54° C |
| 13 | 2-$CH_3$ | H | 6-Cl | $CH_3$ | $CH_3$ | H | H | M.P.: 85–86° C |
| 14 | 2-$CH_3$ | H | 6-Cl | $CH_3$ | H | Cl | H | M.P.: 71–72° C |
| 15 | 2-$CH_3$ | H | 5-Cl | $CH_3$ | H | Cl | H | $n_D^{20}$: 1,6260 |
| 16 | 2-$CH_3$ | 3-Cl | H | $CH_3$ | H | H | H | $n_D^{20}$: 1,6300 |
| 17 | 2-$CH_3$ | 4-Br | H | $CH_3$ | H | H | H | $n_D^{20}$: 1,6461 |
| 18 | 2-$CH_3$ | 4-Br | H | $CH_3$ | $CH_3$ | H | H | $n_D^{20}$: 1,6315 |
| 19 | 2-$CH_3$ | 4-Br | 5-$CH_3$ | $CH_3$ | H | H | H | $n_D^{20}$: 1,6399 |
| 20 | 2-$CH_3$ | 4-$CH_3$ | H | $CH_3$ | H | H | H | $n_D^{20}$: 1,6170 |
| 21 | 2-$CH_3$ | 4-$CH_3$ | H | $CH_3$ | H | $CH_3$ | H | $n_D^{20}$: 1,6115 |
| 22 | 2-$CH_3$ | 4-$CH_3$ | H | $CH_3$ | H | H | $CH_3$ | $n_D^{20}$: 1,6112 |
| 23 | 2-$CH_3$ | 4-$CH_3$ | H | $CH_3$ | $CH_3$ | H | H | $n_D^{20}$: 1,6149 |
| 24 | 2-$CH_3$ | 4-$CH_3$ | H | $CH_3$ | H | Cl | H | $n_D^{22}$: 1,6210 |
| 25 | 2-$CH_3$ | 4-$CH_3$ | H | $CH_3$ | Cl | H | Cl | $n_D^{30}$: 1,6216 |
| 26 | 2-$CH_3$ | H | 6-$CH_3$ | $CH_3$ | H | H | H | $n_D^{20}$: 1,6081 |
| 27 | 2-$CH_3$ | H | 6-$CH_3$ | $CH_3$ | H | $CH_3$ | H | $n_D^{20}$: 1,6011 |
| 28 | 2-$CH_3$ | H | 6-$CH_3$ | $CH_3$ | $CH_3$ | H | H | M.P.: 58–59° C |
| 29 | 2-$CH_3$ | H | 6-$CH_3$ | $CH_3$ | H | t-$C_4H_9$ | H | $n_D^{20}$: 1,5820 |
| 30 | 2-$CH_3$ | H | 6-$CH_3$ | $CH_3$ | H | Cl | H | $n_D^{20}$: 1,6155 |
| 31 | 2-$CH_3$ | H | 6-$CH_3$ | $CH_3$ | Cl | Cl | Cl | M.P.: 70–78° C |
| 32 | 2-$CH_3$ | H | 6-$C_2H_5$ | $CH_3$ | H | H | H | $n_D^{20}$: 1,6070 |
| 33 | 2-$CH_3$ | H | 6-$C_2H_5$ | $CH_3$ | H | Cl | H | $n_D^{20}$: 1,6080 |
| 34 | 2-$C_2H_5$ | H | 6-$C_2H_5$ | $CH_3$ | H | Cl | H | $n_D^{20}$: 1,6053 |
| 35 | 2-$C_2H_5$ | H | 6-$C_2H_5$ | $CH_3$ | Cl | Cl | Cl | M.P.: 48–49° C |
| 36 | H | 4-Cl | H | $CH_3$ | H | $CH_3$ | H | $n_D^{20}$: 1,6354 |
| 37 | 2-Cl | 4-Cl | H | $CH_3$ | H | Cl | H | $n_D^{20}$: 1,6520 |
| 38 | 2-Cl | H | 6-Cl | $CH_3$ | H | H | H | M.P.: 40–42° C |
| 39 | 2-Cl | H | 6-Cl | $CH_3$ | H | $CH_3$ | H | M.P.: 84–86° C |
| 40 | 2-Cl | H | 6-Cl | $CH_3$ | H | Cl | H | M.P.: 74–78° C |
| 41 | 3-Cl | H | 5-Cl | $CH_3$ | H | H | H | $n_D^{20}$: 1,6472 |
| 42 | 3-Cl | H | 5-Cl | $CH_3$ | H | Cl | H | $n_D^{20}$: 1,6505 |
| 43 | 2-Cl | 3-Cl | H | $CH_3$ | H | H | H | $n_D^{20}$: 1,6457 |
| 44 | 2-Cl | 3-Cl | H | $CH_3$ | H | Cl | H | M.P.: 75–78° C |
| 45 | 2-Cl | 4-Cl | 5-Cl | $CH_3$ | H | Cl | H | M.P.: 82–83° C |
| 46 | 3-$CF_3$ | H | 5-$CF_3$ | $CH_3$ | H | H | H | $n_D^{20}$: 1,5470 |
| 47 | 3-$CF_3$ | H | 5-$CF_3$ | $CH_3$ | H | Cl | H | $n_D^{20}$: 1,5530 |
| 48 | 3-$CF_3$ | H | 5-$CF_3$ | $CH_3$ | H | t-$C_4H_9$ | H | $n_D^{20}$: 1,5210 |
| 49 | H | 4-$NO_2$ | H | $CH_3$ | H | Cl | H | M.P.: 77–78° C |
| 50 | H | 4-CN | H | $CH_3$ | H | $CH_3$ | H | M.P.: 70–72° C |
| 51 | H | 4-CN | H | $CH_3$ | H | Cl | H | M.P.: 76–80° C |
| 52 | 2-$CH_3$ | 4-Cl | H | $C_2H_5$ | H | H | H | M.P.: 72–73° C |
| 53 | 2-$CH_3$ | 4-Cl | H | $C_2H_5$ | H | $CH_3$ | H | $n_D^{20}$: 1,6163 |
| 54 | 2-$CH_3$ | 4-Cl | H | $C_2H_5$ | H | H | $CH_3$ | $n_D^{20}$: 1,6153 |
| 55 | 2-$CH_3$ | 4-Cl | H | $C_2H_5$ | Cl | Cl | Cl | $n_D^{20}$: 1,6380 |
| 56 | 2-$CH_3$ | 4-Cl | H | $C_2H_5$ | H | Br | H | $n_D^{20}$: 1,6450 |

The effect of growth inhibition in ornamental plants and ornamental shrubs is that they develop as strong, smaller plants of greater uniformity. Morever ornamental plants normally growing to a substantial height can, by treatment with the compounds of the formula I, be cultivated as compact pot-plants.

In addition to these growth-retardant properties it has also been found that compounds of the formula I employed in lesser amounts may be used to hasten the abscission of fruit in a variety of plant species, in particular of citrus fruits.

Of these various forms of plant growth regulation the most interesting aspects for the purposes of the present invention have been found to be:
1. the diminution and control of sucker growth in tobacco plants;
2. the diminution and control of vegetative growth in soya plants; and
3. the regulation and control of abscission of citrus fruits.

These three major aspects are individually discussed below.

CONTROL OF SUCKER GROWTH IN TOBACCO PLANTS

In accordance with the present invention it has now been found that by the application of the compounds of the formula I as defined above to tobacco plants, plant growth may be restricted and in particular the sprouting of lateral shoots or suckers reduced. This reduction of sucker growth favours the development of large, strong leaves of high quality with a concommitant increase in the economic yield of the treated plants.

The mode and extent of action upon the tobacco plants will depend on the widest variety of factors including the particular variety of plant treated. More especially the precise results achieved will depend on the applied concentration and the time of application in relation to the plant's development.

For tobacco plant sucker control the active substances are preferably applied in the form of liquid preparations. These may be used to treat the aerial portions of the plants and/or the soil in which they are growing or are to be grown. Application to the aerial parts of the plants is preferred and for this purpose the use of solutions or aqueous dispersions of the active compounds is the most appropriate.

The actual amount of active substance applied will need to be adjusted in accordance with the variety of tobacco plant cultivated and the point of time application, as well as in accordance with ambient circumstances such as prevailing weather conditions. Advantageously the rates of application lie between 0.1 and 10 kg active substance per hectare.

The following examples illustrate the effectiveness of the compounds of the formula I — when employed in small amounts above a certain minimum concentration — in providing effective growth regulating control of tobacco suckers.

EXAMPLE 2

Plots of five Hicks tobacco plants on which suckers were beginning to appear were treated with 50 ml. of 50% aqueous acetone containing 0.1% of an octylphenoxypolyethoxyethanol (Triton X-114, sold by Rohm & Haas) and 750 ppm of various compounds as listed in example 1. Twenty-five days later, sucker size was rated. Thirty-three days later, the suckers were removed, counted and weighed.

It was found that tobacco plants treated in the above manner exhibited a marked reduction in sucker growth when compared with plants in untreated control plots. In view of their especial effectiveness in the above tests, together with the absence of undesirable side effects such as leaf burn, compounds numbers 7 and 26 according to example 1 were found to be of particular interest.

EXAMPLE 3

Plots containing six Hicks broadleaf tobacco plants on which suckers were beginning to appear were each treated with 30 ml of a 50% aqueous acetone solution containing 267, 911 or 2670 ppm of various compounds as listed in example 1. These solutions were applied to the top of the tobacco stalk at the stump left by removal of the inflorescence. One month after treatment the percentage of suckers was counted.

It was found that plants treated with the compounds of the formula I showed a marked reduction in sucker growth compared with control plots. Again compounds 7 and 26 are to be highlighted in view of the particularly favourable results achieved.

CONTROL OF VEGETATIVE GROWTH IN SOYA PLANTS

In accordance with a further aspect of the present invention it has been found that the application of compounds of the formula I as described above results in marked reduction in vegetative growth in soya plants. As a direct consequence of this growth inhibition it is possible to sow the soya bean plants with less space between individual rows of plants. This results in a substantial saving of space and a consequential increase in crop yield per unit of cultivated ground.

Furthermore the treated plants have been found to develop stronger, greener leaves than untreated control plants and to produce, in proportion to the foliage, an increased blossom and degree of fruit setting. The smaller size of the plants and the possibility of growing the plants closer together also provide better protection against flattening or other damage by wind and rain.

Again the extent and mode of action will depend on the quantity of active substance applied, the time of application and the variety of plant treated as well as upon ambient conditions.

Application of the active substances as liquid preparations to the aerial portions of the plant is preferred, though application in other forms to the soil may be desirable in certain instances. For effective control of vegetative growth the active ingredient should be applied to the plant in an amount of from 0.05 to 2 kg per hectare.

The following example illustrates the use of the subject compounds in soya beam plant culture.

EXAMPLE 4

Plots of soya bean plants of the varieties "Wayne", "Corsoy" and "Lee 68" each averaging 50 square meters were sprayed in the flowering stage with aqueous preparations of various compounds as listed in example 1, to give an active substance application rate of 0.25 kg/hectare. For each test this treatment was repeated 5 times.

In addition, a corresponding number of plots were treated with 0.04 kg/hectare of the standard TIBA and left as untreated control plots.

At the time of harvest, the average growth height of the plants and the crop yield were determined for each plot.

It was found that treatment with compounds according to example 1 resulted in a marked reduction in plant height at harvesting, together with an increased crop yield. Compounds numbers 2 and 42 according to example 1 were found to produce especially favourable results in the above test and are to be highlighted for use in accordance with this aspect of the invention.

CONTROL OF ABSCISSION IN CITRUS FRUITS

In accordance with a third aspect of the invention it has been found that the application of compounds of the formula I to citrus fruit crops enhances and/or speeds up the development of the abscission layer between the plant and the ripening fruit. As a consequence, when harvesting the fruits less force is required to remove the fruit from the plant. This will be true whether harvesting is by hand or is performed by mechanical means. The advantages arising from the increased ease of removal of the fruit are manifold and include (a) an increase in the amount of fruit which can be harvested in a given time, (b) a decrease in damage caused to the fruit occasioned by the application of undue plucking forces and (c) a decrease in damage caused to the plant during the plucking process.

The extent and nature of the action are governed by the most diverse factors, depending on the type of plant, particularly, however, on the applied concentration and on the time of application with regard to the stage of development of the plant and the fruit. Thus, for example, plants of which the fruit is to be sold, or in some other way utilized, are treated immediately after blossoming or at an appropriate length of time before the gathering of the fruit. The active substances are applied preferably in the form of liquid preparations, these being applied to parts of plants above the soil, to the surface of the soil or into the soil. Application to parts of plants above the soil is preferred, for which purpose solutions or aqueous dispersions are most suitable.

The amount of active substance employed in promoting citrus fruit abscission will largely be governed by the purpose and nature of the application (treatment of the soil or of parts of plants). Usually the active ingredient will be applied at a concentration of from 200 to 4000 ppm e.g. to run of.

The following example is illustrative of this aspect of the invention.

EXAMPLE 5

Parts of branches of orange trees (variety Hamlin or Pineapple or Valencia) carrying at least 20 oranges were sprayed with solutions containing various compounds according to example 1 as active ingredient at concentrations of from 250 to 4000 ppm. Spraying took place shortly before harvesting. The evaluation of the test results was made after 7 days, with two different systems being employed:
  a. Measurement of the plucking force and determination of the reduction thereof effected, with respect to the untreated control specimens.
  b. Number of shed oranges (without shaking) in percent, compared with the untreated control specimens (0%).

The application of compounds in accordance with example 1 in the above test was found to produce a substantial increase in the development of abscission layers on the fruit stalks, an appreciable reduction in the plucking force required to remove the fruit from the branch and, in some instances, even good values with regard to the shedding of fruit.

On account of the especially good results obtained in the above test compound no. 48 according to example 1 is to be highlighted.

The production of active ingredient compositions for use in the process of the present invention is carried out in a manner well-known in the art by the intimate mixing and grinding of the active substances of the general formula I with suitable carriers, optionally with the addition of dispersing agents or solvents which are inert to the active substances. The active substances can exist and be used in the following forms:
  as solids: dusts, sprinkling agents, granulates, coated granules, impregnated granules and homogeneous granules;
  as concentrates of active substances dispersible in water: wettable powder, pastes and emulsions;
  as liquids: solutions and aerosols.

To produce the solid forms (dusts, sprinkling agents, granulates), the active substances are mixed with solid carriers. Suitable carriers are, e.g., kaolin, talcum, bole, chalk, limestone, ground limestone, dolomite, diatomaceous earth, precipitated silicic acid, alkaline earth silicates, sodium and potassium aluminum silicates (feldspar and mica), calcium and magnesium sulfates, magnesium oxide, ground synthetic plastics, fertilizers such as ammonium sulfate, ammonium phosphate, ammonium nitrate, ureas, ground vegetable products such as grain flour, bark flour, sawdust, ground nut shells, cellulose powder, residues of plant extractions, activated charcoal, etc. These carriers can be used separately or they can be mixed with each other.

The grain size of the carriers is, for dusts, advantageously up to ca. 0.1 mm, for sprinkling agents it is ca. 0.075 to 0.2 mm and for granulates 0.2 mm upwards.

The concentrations of active substances in the solid preparations are, as a rule, 0.5 to 80% of the total weight.

To these mixtures can also be added additives which stabilize the active substance and/or non-ionic, anion-active and cation-active substances, which, for example, improve the adhesion of the active substances on plants and parts of plants (glues and adhesives) and/or ensure a better wettability (wetting agents) and also dispersibility (dispersing agents). The following are examples of adhesives: olein-chalk mixtures, cellulose derivatives (methyl cellulose, carboxymethyl cellulose), hydroxyethyl glycol ethers of mono- and di-alkyl phenols having 5 to 15 ethylene oxide radicals per molecule and 8 or 9 carbon atoms in the alkyl radical, lignin sulfonic acids, their alkali and alkaline earth metal salts, polyethylene glycol ethers, fatty alcohol polyethylene glycol ethers having 5 to 20 ethylene oxide radicals per molecule and 8 to 18 carbon atoms in the fatty alcohol part, condensation products of ethylene oxide, propylene oxide, polyvinyl pyrrolidones, polyvinyl alcohols, condensation products of urea/formaldehyde as well as latex products.

Concentrates of active substances which can be dispersed in water (wettable powders), pastes and emulsion concentrates, are agents which can be diluted with water to give any desired concentration. They consist of active substances, carriers, optionally additives which stabilize the active substance, surface agent substances and antifoaming agents and, optionally, solvents. The concentration of active substance in these agents is 5 to 80% of the total weight of the latter.

The wettable powders and pastes are obtained by mixing and grinding the active substance with dispersing agents and pulverulent carriers in suitable devices until homogeneity is attained. Suitable carriers are, for example, those previously mentioned for solid preparations. It is advantageous in some cases to use mixtures of different carriers. Suitable dispersing agents are, e.g., condensation products of sulfonated naphthalene and sulfonated naphthalene derivatives with formaldehyde, condensation products of naphthalene or of naphthalene sulfonic acids with phenol and formaldehyde, also alkali, ammonium and alkaline earth metal salts of lignin sulfonic acid, also alkylaryl sulfonates, alkali and alkaline earth metal salts of dibutyl naphthalene sulfonic acid, fatty alcohol sulfates such as salts of sulfated fatty alcohol glycol ethers, the sodium salt of oleyl ethionate, the sodium salt of oleyl methyl tauride, dietertiary acetylene glycols, dialkyldilauryl ammonium chloride and fatty acid alkali and alkaline earth metal salts.

Examples of anti foaming agents are: silicones, etc. The active substances are so mixed, ground, sieved and strained with the above-mentioned additives that the solid particle size in wettable powders does not exceed 0.02—0.04 mm and, in the case of pastes, 0.003 mm. To produce emulsion concentrates and pastes, dispersing agents such as those stated in the previous sections, organic solvents and water are used. Examples of solvents are: alcohols, benzene, xylenes, toluene, dimethyl sulfoxide and mineral oil fractions boiling between 120° and 350° C. The solvents must be practically without smell, not phytotoxic, inert to the active substances and not easily flammable.

In addition, the agents according to the invention can be used in the form of solutions. For this application, the active substance or substances of the general formula I are dissolved in suitable organic solvents, mixtures of solvents or in water. Aliphatic and aromatic hydrocarbons, chlorinated derivatives thereof, alkyl naphthalenes, mineral oils, on their own or mixed with each other, can be used as organic solvents. The solvents should contain the active substances within a concentration range of 1 to 20% calculated on the total weight of the resulting solution.

Other biocidal active substances or agents can be mixed with the described compositions according to the invention. Thus, in addition to the stated compounds of the general formula I and other herbicides, the new agents can also contain, e.g., insecticides, fungicides, bactericides, fungistatics, bacteriostatics or nematocides in order to widen the range of action. The compositions according to the invention can also contain fertilizers and micronutrients.

We claim:

1. A method for inhibiting the growth of lateral suckers on tobacco plants, which method comprises applying to the tobacco plant an effective sucker growth inhibiting amount of a compound of the formula I

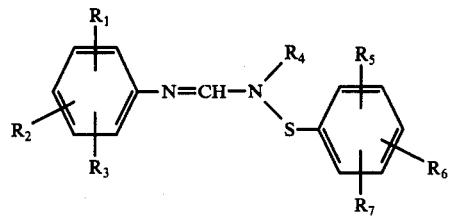

wherein
$R_1$, $R_2$ and $R_3$, independently of one another, represent hydrogen, chlorine, bromine, methyl, ethyl, trifluoromethyl or cyano,
$R_4$ represents methyl or ethyl and
$R_5$, $R_6$ and $R_7$, independently of one another, represent hydrogen, chlorine, bromine or $C_1$-$C_4$-alkyl.

2. A method according to claim 1, wherein in the compound of the formula I
$R_1$ and $R_2$, independently of one another, represent chlorine, methyl or trifluoromethyl,
$R_3$ represents hydrogen,
$R_4$ represents methyl,
$R_5$ and $R_6$, independently of one another, represent hydrogen, chlorine, methyl or tert.-butyl and
$R_7$ represents hydrogen.

3. A method according to claim 2, wherein in the compound of the formula I
$R_1$ represents chlorine or methyl in the 2- or 3-position,
$R_2$ represents chlorine or methyl in the 4- or 6-position,
$R_3$ represents hydrogen,
$R_4$ represents methyl,
$R_5$ represents hydrogen, chlorine or methyl and
$R_6$ and $R_7$ both represent hydrogen.

4. A method according to claim 3, wherein said compound corresponds to the formula

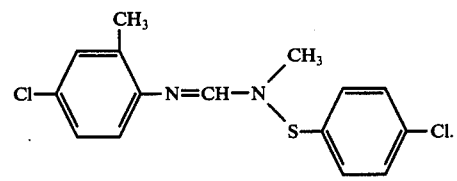

5. A method according to claim 3, wherein said compound corresponds to the formula

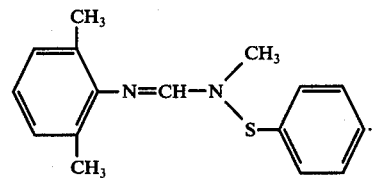

* * * * *